UNITED STATES PATENT OFFICE.

GUSTAV EMIL KÄSEMODEL, OF ZWICKAU, SAXONY, GERMANY.

WATERPROOFING LEATHER SOLES.

SPECIFICATION forming part of Letters Patent No. 360,596, dated April 5, 1887.

Application filed June 16, 1886. Serial No. 205,330. (No specimens.)

*To all whom it may concern:*

Be it known that I, GUSTAV EMIL KÄSEMODEL, of the city of Zwickau, in the Kingdom of Saxony, Empire of Germany, have invented certain new and useful Improvements in Waterproofing Leather Soles, of which the following is a specification.

The object of my invention is to render leather soles more durable and to make them water-proof.

In carrying out my invention, the leather soles are impregnated with a mixture of resin, sandarac or other gum, alcohol, spirits of turpentine, benzine, chloroform, phosphoric acid, and copaiba-oil, which ingredients are mixed in the following proportions: To produce ten liters of the waterproofing-solution, two thousand grams of the best and purest resin and two hundred grams of sandarac gum or any other suitable hard gum are finely powdered and mixed with one liter of alcohol of ninety per cent. In a separate vessel one liter of spirits of turpentine, one liter of benzine, one-fourth of a liter of chloroform, and 1.32 of a liter of phosphoric acid are carefully mixed and allowed to stand in a closed vessel for about two hours. This mixture is then added to the above-described mixture of resin, sandarac gum, and alcohol. I then add 1.32 of a liter of the copaiba-oil and agitate the mixture, while exposing it to a moderate heat, for about one hour, care being taken to keep the vessel containing the mixture closed during this time. The leather soles are placed into this mixture and remain in the same from ten to twelve hours, during which time the mixture is heated moderately and the vessel containing the same kept closed. The soles are then removed from the liquid, their outer surface is carefully dried for a period of from six to eight days in a suitable drying-chamber or in the air. The bottle containing the impregnating-liquid must always be closed well, so as to prevent evaporation. In case the liquid thickens, a greater or smaller quantity of benzine is added.

Having thus described my invention, I claim as new and desire to secure by Letters Patent—

1. The herein-described improvement in the art of impregnating or waterproofing leather soles, consisting in saturating them with a mixture of resin, sandarac gum, alcohol, spirits of turpentine, benzine, chloroform, phosphoric acid, and copaiba-oil, substantially as set forth.

2. The herein-described composition for impregnating and waterproofing leather soles, consisting of a mixture of resin, sandarac gum, alcohol, spirits of turpentine, benzine, chloroform, phosphoric acid, and copaiba-oil, substantially as set forth.

In testimony that I claim the foregoing as my invention I have signed my name in presence of two subscribing witnesses.

GUSTAV EMIL KÄSEMODEL.

Witnesses:
  B. ROI,
  H. SCHLOSS.